9769X
No Printed Specification Available
I. Gay,
Wood Planing Machine.
Patented June 25, 1836.
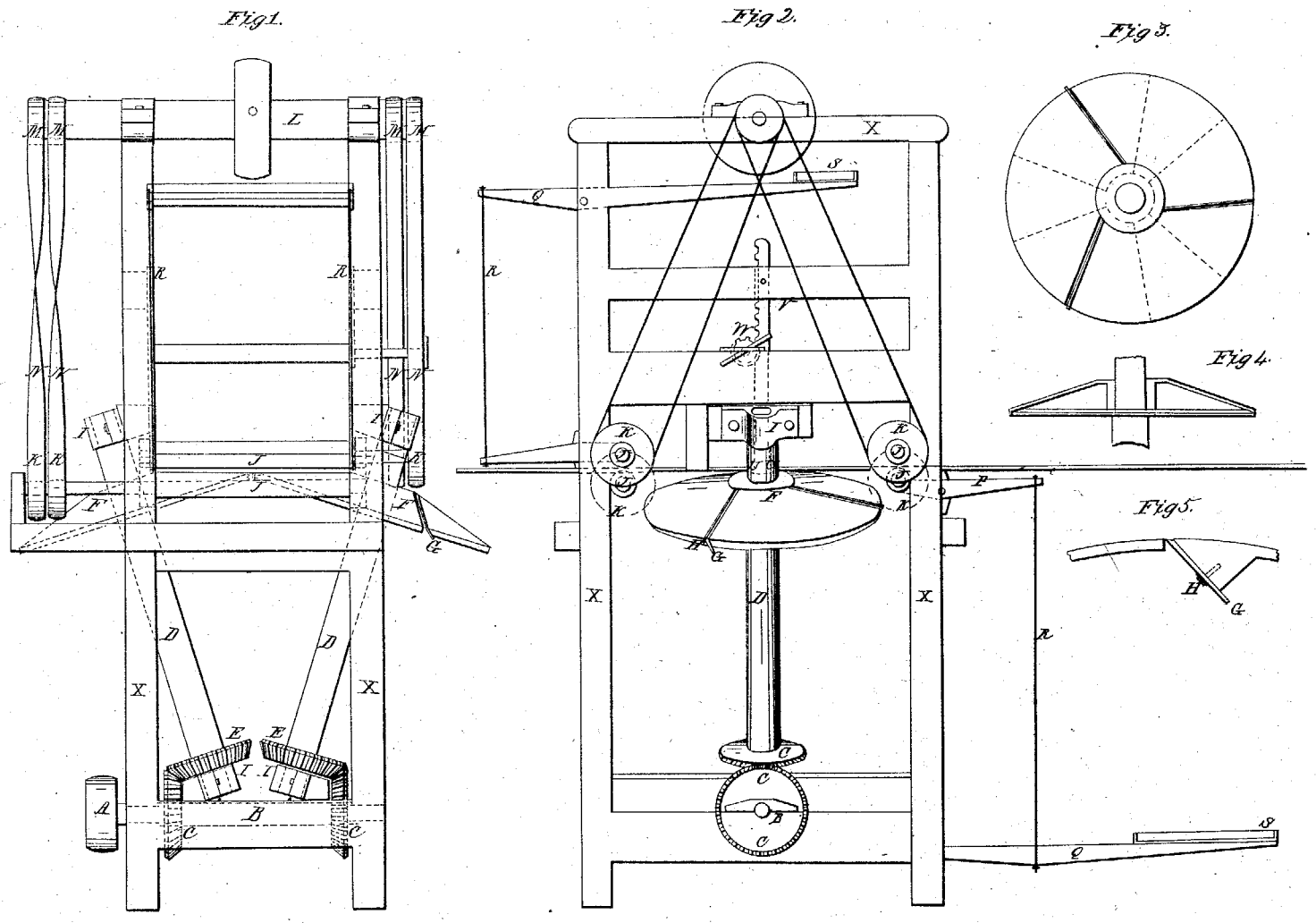

6/25/1836 9769X

June 25, 1836 [illegible]

Ira Gay of Dunstable, New Hampshire

9475

Letters Patent

The schedule referred to in these Letters Patent and making a part of the same, containing a description in the words of the said Ira Gay himself of his improvement in the machine for planing [illegible] Plank and other articles.

To all to whom these presents shall come

Be it known that I, Ira Gay of Dunstable in the County of Hillsborough and State of New Hampshire have invented a new and useful improvement in machine for planing [illegible] Plank and other articles & that the following is a full and exact description of the construction and operation of the said machine as invented or constructed by me.

Fig. I is a front view of the machine [illegible] [illegible] drawing.

Fig. II is a side view

Fig. III is a horizontal view of the plane stock

Fig. IV is a vertical section of the plane stock

Fig. V is a section of the plane stock [illegible]

[illegible] the plane [illegible] and [illegible] fitting it to the stock. The same letters in the different figures represent the corresponding parts.

A is the [illegible] pulley to which the power for driving the plane [illegible] applied by means of a belt.

B [illegible] shaft which [illegible] the driving wheel CC.

D.D. [illegible] upright shafts [illegible] a little from a [illegible] [illegible]

E.E. [illegible] shaft [illegible] to the upright shaft D.D. [illegible] by the wheels C.C. F.F. [illegible] the

6/25/1836

9769X

[illegible]

6/25/1836 9769X invention the mode of holding the face of the plane stock as herein described [illegible] the face of the machine as [illegible] the [illegible] of the [illegible] patent [illegible] In testimony of which I have hereunto set my hand this [illegible] day of June A.D. 1836.

Witnesses
Chas. Allen
Thomas Ingham

[illegible]

[illegible]